Patented Apr. 13, 1943

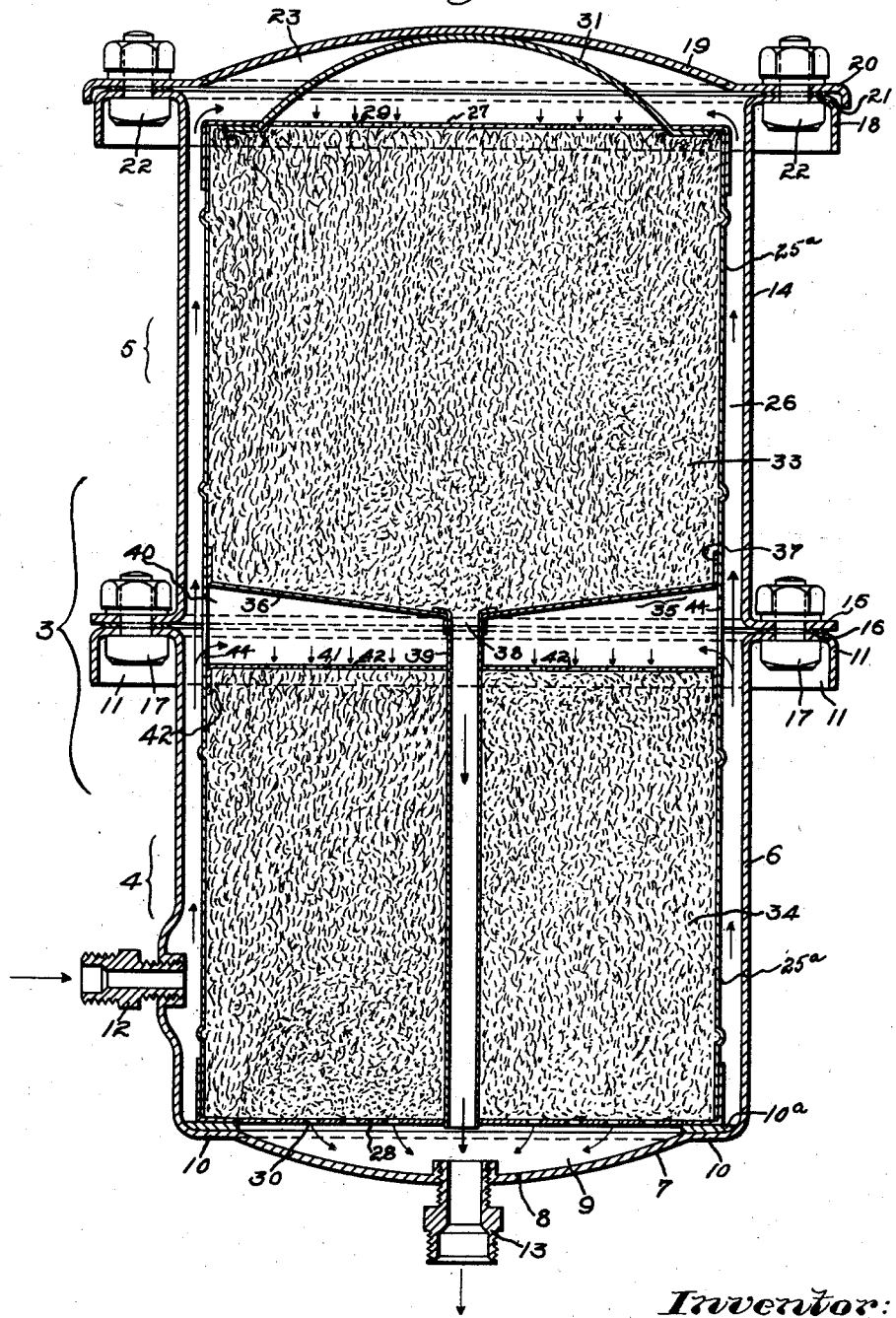

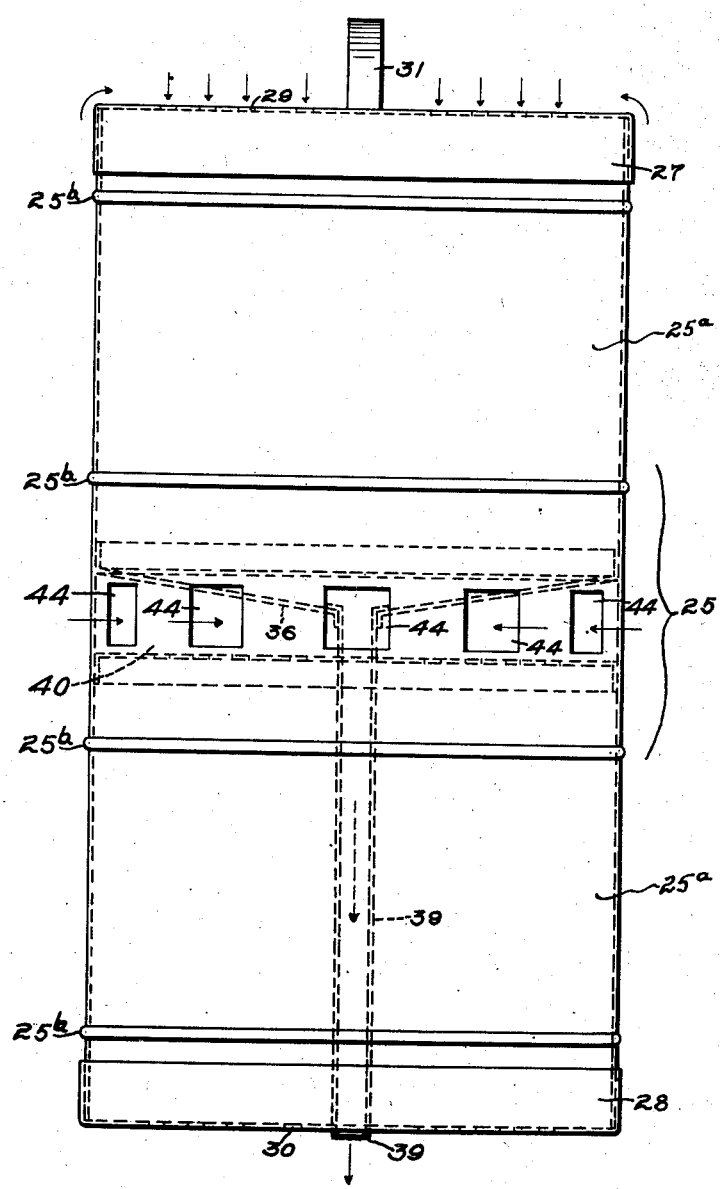

2,316,206

UNITED STATES PATENT OFFICE 2,316,206

LIQUID FILTER AND FILTERING UNIT THEREFOR

Steven B. Wilson, Newton, Mass., assignor to Fram Corporation, a corporation of Rhode Island Application January 4, 1940, Serial No. 312,410

11 Claims. (Cl. 210—134)

My present invention relates to means for filtering liquids, especially filters for the engine lubricant and crank case oil of automotive and other internal combustion engines. More particularly the invention concerns and in various respects presents improvement in that type of filter as disclosed for example in U. S. Patent No. 2,081,968 to John D. Wicks et al., dated June 1, 1937. It has among its main objects to provide an extended, duplex or plural filtering device whereby the capacity and working rate of the filter is materially increased, potentially doubled or more, with little or no increase in its diameter or horizontal dimensions, while retaining the general construction and arrangement of the main elements.

In the drawings illustrating by way of example one embodiment of the invention:

Fig. 1 is a vertical section centrally through the filter device as a whole; and Fig. 2 is a side elevation of the replaceable filter unit or cartridge of Fig. 1.

To refer to the drawings in more detail, the oil or other liquid filter device there shown comprises a substantially cylindrical and herein upright casing indicated in its entirety by the numeral 3. While this casing may be made in one piece, except for a top cover, in the present example it comprises a lower casing unit or section 4 and an extension or upper casing 5. The lower casing 4 is a cup-shaped element including a substantially cylindrical side wall 6 and a bottom wall 7 having a central depression or outwardly bulged portion 8 providing a bottom chamber 9. An inward annular projection 10 from the side wall connects the latter with the bottom wall and provides a sealing seat for the filter cartridge, to be described. The side wall 6 of this lower portion 4 of the casing is turned out at its top to form a supporting and attaching flange 11 for the extension or upper casing 5.

At a convenient point above said cartridge seat or seal 10 the side wall of the casing is apertured to receive a threaded nipple or like connection 12 and the depressed portion 8 of the bottom wall is similarly provided with a threaded connector or nipple 13. Depending on the selected direction of flow one of said connections admits the liquid or oil to be filtered and the other discharges the filtered liquid. As represented in the drawings merely by way of example the lateral connection 12 is assumed as being used as the inlet and the bottom connection 13 as the outlet.

The upper portion 5 of the casing is in effect a continuation or extension of the lower unit 4. Its side wall 14 is outturned at its lower edge to form an annular flange 15 having a supporting seat on the flange 11 of the lower casing part. A gasket 16 desirably is placed between the two flanges 11 and 15, and these are removably fastened together as by a suitable number of bolts and nuts 17 to provide the elongated casing 3 as a whole.

The other or upper end of the casing extension 5 is similarly outturned to afford a receiving flange 18 for the removable casing cover 19. The latter has a flat peripheral or flange portion 20 seating on said casing flange 18, a gasket 21 desirably being placed between said flange elements. The casing cover 19 is demountably held in closing position as by a circumferential series of bolts and nuts 22 similarly as at the joint of the two casing sections 4 and 5. Within its flange portion 20 the cover 19 is deflected or arched upwardly to form the top wall of a top chamber 23 between the casing cover and the duplex filter unit or cartridge presently to be described.

In the illustrated construction the lower section 4 of the casing is of the same size and construction usual for a single section or one-way filter such as that of the Wicks et al. patent previously mentioned. Thus in effect said element is standardized and adapted for use interchangeably either as the entire casing body for a single-section filter containing a corresponding cartridge and filter mass, as in said Wicks et al. patent for example, or as the base or bottom section of the duplex filter device of the present invention. By thus providing a common element, the lower casing 4 of the accompanying drawings, structurally adapted to either and both of said installations, substantial economies are effected in the tooling requirements and other manufacturing costs.

The replaceable filter unit or cartridge indicated generally by the numeral 25 is seen in section in Fig. 1, in its operative position within the casing 3, and is shown separately in Fig. 2. It comprises a cylindrical body or container 25a similarly shaped as the casing and somewhat less in diameter than the inner bore of the latter, to provide a circumferential chamber 26, Fig. 1, between the casing and the cartridge set centrally within it. The cartridge body 25a has flanged end covers 27 and 28, these desirably being soldered or otherwise secured in place, after the filtering material and other internal parts have been installed. Both said covers 27 and 28 are perforated over their main areas, as indicated at 29 and 30 respectively, for passage of the liquid to or from the corresponding cartridge section.

Referring to Fig. 1, the cartridge 25 stands erect on a gasket 10a on the seat 10 at the lower end of the casing. It is there forced into sealing engagement, preferably by resilient means such as the arcuate spring steel or other spring member 31 disposed between the casing top 19 and the top cover 27 of the cartridge. As in the patent referred to said spring member 31 may be separate or may be attached to the casing cover, or, as here shown, may be mounted on the cartridge in a fashion to serve as a handle for the latter as well as to function as the resilient means cooperating with the casing cover to hold the cartridge fast within the casing.

Inside the cartridge there are disposed two separate and distinct upper and lower masses 33 and 34 of filtering material such as wadding or other suitable substance. These two masses may be variously proportioned as to volume, depending on the relative quantities of the total incoming oil or other liquid to be distributed to each. As here shown the cartridge is internally partitioned substantially equally into upper and lower sections by means of a funnel-like divider or separator indicated generally by the numeral 35. Said element herein comprises an imperforate floor 36 shaped and dimensioned to fit within the cartridge and having a peripheral flange 37 received and secured flatwise against the cartridge side wall. This floor member 36 is sloped toward its center and in the direction of the liquid flow, in the manner of a shallow funnel. It has a central opening 38 for a tube or duct 39 adapted to extend in the direction of slope of the floor or partition 36, through the opposite portion of the cartridge and through the end cover of that portion, into communication with the bottom chamber 9 of the casing, preferably substantially opposite the casing aperture 13. This divider 35 herein supports the upper wadding mass, confining the latter between the divider or partition and the perforate top cover 27 of the cartridge. The side wall 25a of the cartridge 25 may be formed at selected levels with any desired number of outwardly projecting annular ribs or corrugations 25b, two of which are here shown at each half-section of the cartridge. Said ribs serve to reinforce the cartridge wall and also tend to hold the filtering masses against undesired displacement or undue compaction.

Spaced vertically below the divider floor 36 so as to form with the latter an intermediate chamber 40, is a second transverse wall 41 having a peripheral flange 42 engaging and preferably secured to the inner side wall of the cartridge. This second intermediate wall 41 defines the lower extent of said intermediate chamber 40 and serves also as a top cover and confining means for the lower filter mass 34. In contrast to the uninterrupted funneled flooring wall 36, however, it is perforated over its main area, having therein a multiplicity of apertures as indicated at 43, for admission or egress of a portion of the oil or other liquid relative to the lower filter mass 34. In the illustrated example the flow is assumed to be downward through the lower mass 34 and out through the perforate bottom cover 28 of the cartridge to the bottom chamber 9 and the passage 13, here serving as the outlet for the filtered liquid.

At its circumferential region opposite the intermediate chamber 40, and hence in the illustrated example at approximately mid-height of the cartridge, the side wall of the latter is formed with a plurality of openings 44, shown as of relatively large area as compared with that of the perforations in the cartridge covers or in the internal wall 41. These openings 44, again depending on the direction of flow, receive the liquid from or admit the incoming liquid to, the intermediate chamber 40. Under the operating conditions assumed in the drawings they serve in the latter capacity, that is, as inlets. They are shown as having a height nearly equal that of the intermediate chamber 40 at the outer portion thereof and of about the same width.

In use, in the illustrative example of the drawings, the entering liquid, such as engine lubricating oil from the crank case, passes through the casing inlet 12 to the circumferential chamber 26 around the cartridge. Under its own pressure the liquid rises about the cartridge, some of it, approximately half in this instance, being conducted to the top chamber 23 of the casing and thence being forced down through the upper filter mass 33 and out through the duct 39 to the casing outlet 13. The other portion of the oil or other liquid enters the cartridge chamber 40 through the intermediate openings 44 in the cartridge wall, and again under its own pressure is forced downwardly through the perforate top wall 41 of the lower filter mass 34 and through the latter and the perforate bottom cover 30 to the casing bottom chamber 9. Thence it is discharged, together with the other filtered oil from the top section or unit of the cartridge, through the casing outlet 13, for return to the crank case or other point of use.

The construction and arrangement of the parts as illustrated and described, and the indicated directions of flow for the liquid have been found highly effective in actual practice. It will be understood, however, that the direction of flow may be the reverse of that described and indicated on the drawings by the arrows, as to either or both of the two filtering sections or units of the cartridge, with appropriate location and arrangement of the various admission and discharge apertures.

My invention is not limited to the particular embodiment as herein illustrated or described by way of example, its scope being pointed out in the following claims.

I claim:

1. In a liquid filter, in combination: a casing; a cartridge within and in spaced relation to the casing laterally and at one end and also centrally spaced from, and peripherally forming a seal with, the casing at the other end, said cartridge having perforate outer ends and a peripheral series of openings spaced from the ends; a transverse partition between said openings and one end of the cartridge, said partition having a through aperture but otherwise imperforate; a duct member extending from said partition aperture to said other end of the casing; filtering means in the cartridge at the opposite sides of said partition; and passages in the casing respectively to receive and to emit the liquid, one passage at the centrally spaced end of the cartridge and the other at the opposite side of said peripheral seal between the cartridge and the casing.

2. In a liquid filter, an outer elongated casing having a side wall and a bottom wall, the latter formed with a flat seat adjacent the side wall and with a downwardly bulged center portion, a cartridge of similar cross-sectional shape and of a size to fit within said casing and having a flat end to fit said seat and to provide a chamber between it and the bulged central portion of the casing bottom wall, a cover for the casing, means acting between the cover and the cartridge to urge the latter into a liquid-tight sealing position on said seat, the casing having a liquid outlet from said bottom chamber and a liquid inlet disposed above said sealed seat for the cartridge, a transverse imperforate wall in the cartridge partitioning it into upper and lower sections, the cartridge having perforate top and bottom end walls, a filter mass in each of said cartridge sections, an outlet duct for the upper section communicating between its filter mass and the casing bottom chamber, and inlet openings in the cartridge side wall at the upper portion of the lower section of the cartridge.

3. A duplex cartridge for a liquid filter, said cartridge comprising a cylindrical container including perforate end walls and a side wall having at approximately mid-length a plurality of openings distributed around it and being otherwise imperforate, filter masses in the container at the opposite sides of said openings, an imperforate transverse partition at the inner end of one filter mass, between it and said openings, and a longitudinal duct communicating with the mass which has said partition at its inner end and extending through the other mass and to the adjacent end wall of the container.

4. A duplex filter cartridge according to claim 3 wherein a transverse chamber is provided in the container opposite and communicating with the plurality of openings in the side wall, between the imperforate transverse partition and that filter mass not referred to as having said partition at its inner end, the duct extending across said chamber in the direction longitudinally of the container.

5. In a liquid filter, a casing, a cartridge through which liquid is to be passed, said cartridge having an enclosing side wall and end walls carried by the side wall and forming with it a self-contained unit adapted for ready unitary insertion into and removal from the casing, and said cartridge having openings in portions respectively adjacent each of its ends and also in an intermediate portion substantially spaced longitudinally from each of its ends and being otherwise imperforate, a seal between the cartridge and casing, disposed between one of the cartridge end portions having the openings and the openings in said intermediate portion, said cartridge between said seal and its other end being smaller than the casing to provide a chamber between them and connecting with the openings in said intermediate portion and in said other end of the cartridge, a liquid inlet through the casing at one side of said seal and opposite an imperforate wall portion of the cartridge, means on the other side of the seal to discharge the filtered liquid from the casing, filter material in the cartridge, and filter-material-separating imperforate transverse partition and associated conducting means in the cartridge to cause liquid entering it through the openings in its said other end portion to pass to said discharge means through a part only of the filter material and to cause liquid entering the cartridge through the openings in its intermediate portion to pass to said discharge means through another part of the filter material.

6. In a liquid filter, a casing providing side, top and bottom walls with the bottom wall extending inwardly from the side wall to form a seat, a removable cartridge within said casing having an end portion providing a liquid-tight fit on said seat, the end portions of said cartridge being perforate and the intermediate side portions imperforate save for a circumferential series of apertures at approximately mid-height thereof, said cartridge and casing being of a relative size and shape to provide chambers between them on either side of said seat, one of said chambers disposed along the side wall of the cartridge and also between it and the casing top wall, a liquid outlet from the casing communicating with the chamber below said seat, a liquid inlet to the casing communicating with the chamber above said seat and opposite an imperforate side portion of the cartridge, the liquid entering at the casing inlet passing in part along the cartridge side wall to the top thereof and in part through said sidewall openings of the cartridge, filter material in the cartridge above and below said sidewall openings, and transverse divider and duct means in the cartridge causing the liquid entering it through said sidewall openings to pass downwardly through the filter material below them and to the casing bottom chamber and outlet and that entering it through its perforate top wall to pass downwardly through the filter material above said sidewall openings and through the lower portion of the cartridge but separately from the filter material therein, to said casing bottom chamber and outlet.

7. A filter of the character described comprising, in combination, an outer casing having a side wall, a removable top cover and a bottom wall formed with a peripheral shoulder providing a seat and with a central depressed chamber, said casing having a liquid inlet in its side wall and a liquid outlet from said chamber at its bottom wall, a filter cartridge removably received in the casing and supported on said seat in sealed relation to it, said cartridge being smaller than the casing sufficiently to afford a circumferential chamber between it and the casing side wall and between the cartridge top and the casing cover, said cartridge having its top and bottom walls perforated and having a series of openings around its side wall at a level substantially spaced from each of its ends, spring means between the casing and the cartridge to hold the latter in place, filter masses in the cartridge respectively above and below its sidewall openings, and a funnel-like divider in the cartridge with its transversely projecting portion supporting and closing off the upper filter mass from said sidewall openings and with its tubular portion providing a duct downwardly through the lower filter mass to the chamber at the casing bottom wall, whereby liquid entering at the casing inlet is distributed and caused to flow in part through the perforate top wall of the cartridge, the upper filter mass and said duct and out through said bottom chamber, and in part through said sidewall openings and through the lower filter mass to said bottom chamber.

8. A filter for liquids comprising, in combination: an upright substantially cylindrical casing providing a side wall, a bottom wall with a central depressed portion affording a seat around it, and a removable covering top wall; a liquid inlet on the side wall; an outlet for the filtered liquid at the depressed portion of the bottom wall; a duplex replaceable filter cartridge received in the casing and comprising a cylindrical container having an enclosing side wall and substantially flat, perforate top and bottom walls, said cartridge being spaced from the side and top walls of the casing and from the depressed portion of the bottom wall and being supported on said seat of the latter in sealing relation; retaining means for the cartridge in the space between it and the top wall of the casing; said cartridge containing upper and lower filtering masses each occupying approximately the corresponding half-portion of the cartridge container; an internal perforate cross wall overlying and confining the lower filtering mass; an imperforate downwardly dished supporting bottom wall for the upper filtering mass and spaced from said perforate top wall of the lower mass to form a chamber between them; a duct leading from said bottom wall of the upper mass and downwardly through the lower mass into communication with the outlet of the filter casing; and liquid inlet passages in the cartridge container side wall at the level of said chamber between the two filtering masses; said casing and cartridge and said associated parts being constructed and arranged for liquid to enter at the casing inlet and to pass between the cartridge and the casing side walls and to be distributed in part to the perforate top wall of the cartridge for down passage through the upper mass and the duct leading therefrom, and in part through said chamber inlet passages to the perforate top wall of the lower mass and downwardly through the latter, the filtered liquid from both masses having egress at the outlet on the casing bottom wall, said construction and arrangement also adapting the filter for flow of the liquid reversely to that just stated.

9. An oil filter comprising, in combination, a casing including longitudinally oppositely disposed matching filter casing sections each having an enclosing side wall and an outer end wall, a filter mass in each section, imperforate wall means laterally confining each filter mass and spaced from the casing to provide an annular passage surrounding the respective filter mass, between the latter and the side wall of its casing section, a transverse chamber between the filter masses and communicating laterally with said annular passages, imperforate means separating said chamber from one filter mass, a longitudinal duct extending and communicating between said separated filter mass, through said imperforate means, across said transverse chamber and through the other filter mass, an oil passage in the casing side wall communicating with said annular passages and with said transverse chamber, and an oil passage in the end wall of the casing section of the filter mass through which said longitudinal duct extends, means affording said latter oil passage communication with said duct-associated filter mass, and means sealing said end-wall oil passage from the adjacent annular passage of the casing, whereby one of said oil passages serves to admit unfiltered oil for flow in part through one filter mass and in the remaining part separately through the other mass and said duct, and the other of said oil passages receives and discharges the filtered oil from both masses.

10. A liquid filter comprising, in combination, a casing assembly including a plurality of casing sections each having an enclosing side wall and adapted for attachment end to end, means for so attaching the casing sections in sealed relation, closure walls for the opposite ends of the casing assembly, a filter cartridge having a filtering unit for each casing section, said cartridge positioned within and in spaced relation to the casing assembly laterally and at one end and also centrally spaced from and peripherally forming a seal with the casing at the other end thereof, said cartridge having perforate outer ends for communication with the end spaces of the casing assembly and having an intermediate peripheral series of openings at a transverse plane between filter units, an imperforate transverse partition forming an inner end closure for one filter unit, between the latter and said openings, a longitudinal duct extending from said closed unit through said partition and lengthwise through and opening at the opposite end of the adjacent filter unit, and inlet and outlet openings for the casing assembly, one in is end wall adjacent said end opening of the longitudinal duct and the other communicating with the lateral space between the casing assembly and the cartridge.

11. A liquid filter comprising, in combination, a casing having side and end walls, longitudinally alined filtering units in the casing, each imperforate laterally and spaced from the casing side walls to provide an annular passage surrounding said units, end chambers in the casing, said annular passage communicating with one end chamber and being sealed from the other, the filtering units having outer end openings communicating with the respectively adjacent end chambers, a transverse chamber between filter units, said transverse chamber communicating with the annular passage and with the inner end of that filter unit the outer end of which opens to the sealed end chamber, imperforate means closing off the inner end of the adjacent filter unit from said transverse chamber, a longitudinal duct from said closed filter unit end to said sealed end chamber, and outlet and inlet ports for the casing, one in its end wall adjacent and communicating with said sealed end chamber, and the other communicating with the annular passage in the casing.

STEVEN B. WILSON.